Aug. 17, 1965  J. E. BECKER  3,200,595
TORQUE CONTROLS FOR FLUID COUPLINGS
Filed March 21, 1963  3 Sheets-Sheet 1

INVENTOR
JOHN E. BECKER
BY: Charles E. Church
ATTORNEY

Aug. 17, 1965 J. E. BECKER 3,200,595
TORQUE CONTROLS FOR FLUID COUPLINGS
Filed March 21, 1963 3 Sheets-Sheet 3

INVENTOR
JOHN E. BECKER

BY: Charles E. Church
ATTORNEY

United States Patent Office 3,200,595
Patented Aug. 17, 1965

3,200,595
TORQUE CONTROLS FOR FLUID COUPLINGS
John E. Becker, Darlington Township, Durham County, Ontario, Canada, assignor to Eclipse Consultants Limited, Oshawa, Ontario, Canada
Filed Mar. 21, 1963, Ser. No. 266,871
6 Claims. (Cl. 60—54)

As fluid couplings impose a torque upon a prime mover many times greater than normal load torque whenever a coupling turbine is stalled while the coupling impeller is being driven, as for example, due to overload or starting periods under heavy load, it is very advantageous to automatically withdraw a suitable proportion of normal fluid volume from the working chamber of a coupling to reduce torque under excessive load conditions and to subsequently automatically re-admit a required volume of fluid to the working chamber as the torque approaches its normal magnitude.

The object of this invention is to attain the foregoing advantage in providing automatic fluid movement controls applicable to known fluid coupling arrangements wherein the coupling impeller blades are mounted within one side of a torioidal impeller shell constituting the working chamber of the coupling and rotated by a prime mover, the vaned turbine actuating the load being housed within a semi-toroidal shell freely contained within the other side of the toroidal shell.

In one arrangement attaining the object of the invention the working chamber of the coupling is housed within a fluid reservoir shell attached to and rotating in unison with the turbine driven by the impeller, one or more radial fluid ejection tubes being carried by and rotating in unison with the turbine shell for the purpose of removing fluid from the fluid vortex in the working chamber of the coupling should the turbine become retarded or stalled under overload, the fluid removed from the vortex being discharged into the reservoir rotating at turbine speed, the reservoir containing one or more non-rotating fluid scoop tubes returning fluid to the working chamber. As the volume of fluid retained in the reservoir and passing to the partly depleted vortex is governed by the speed of rotation of the reservoir the object of the invention is accomplished.

A modified arrangement is applicable in attaining the object of the invention in governing the volume of fluid in the working chamber of a coupling to reduce torque, and wherein the fluid reservoir shell is attached to and rotates in unison with the impeller. The turbine carries radial fluid ejection tubes for the purpose of removing fluid from the chamber due to pressure of the fluid vortex against the inlet openings of the tubes under retardation or stalling of the turbine and thus creating a fluid stream passing to the reservoir; the reservoir being divided into a fluid receiving compartment and a fluid ejection compartment by a partition containing one or more ports through which fluid may flow in restricted passage, the fluid ejection tubes feeding the fluid stream to the fluid receiving compartment, fluid entering the fluid ejection compartment being removed therefrom by one or more scoop pipes returning fluid to the fluid stream passing to the reservoir.

With the foregoing and other objects in view, as shall be apparent as the specification proceeds, the invention consists of improvements in fluid couplings all as hereinafter more particularly described, and illustrated in the accompanying drawings, in which.

Figures 1, 2:
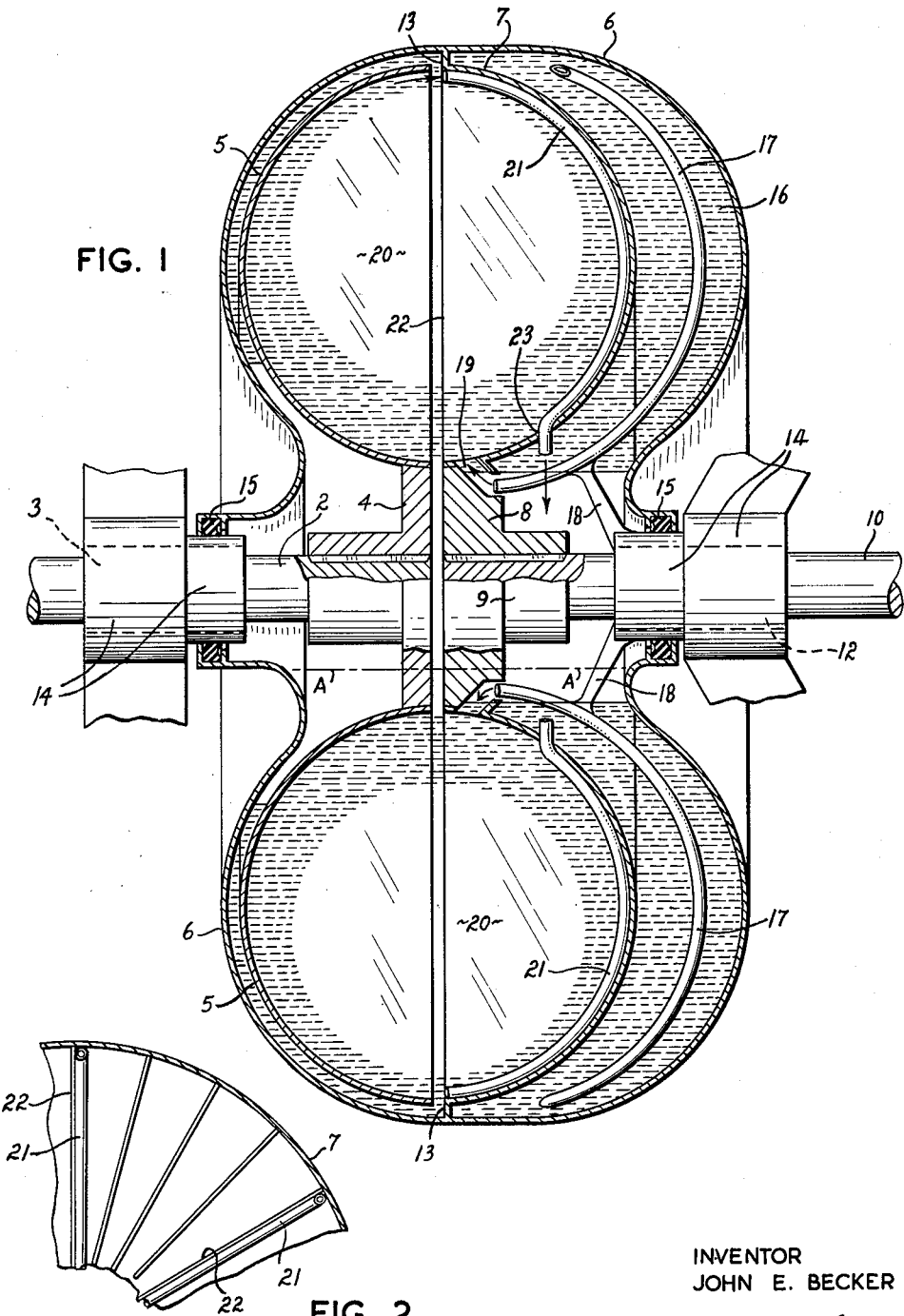
FIG. 1 is a longitudinal cross-sectional view through one coupling arrangement and showing fluid circulation through the working chamber of the coupling for reduction of torque under excessive load.
FIG. 2 is a transverse view of a fragmentary portion of the coupling turbine shell.
Figure 3:
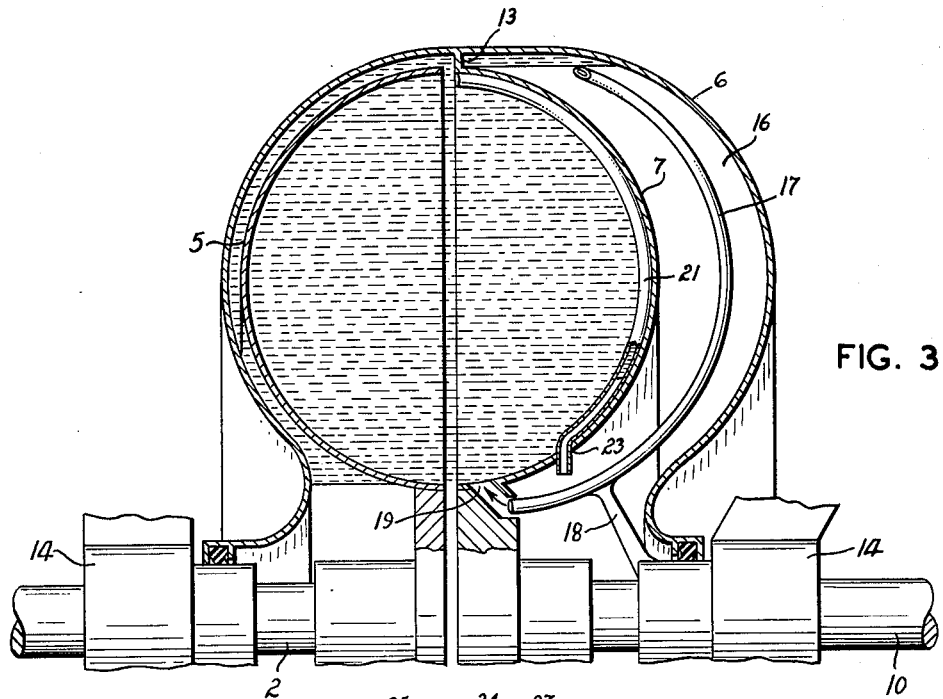
FIG. 3 is a cross-sectional view through a portion of the coupling, similar to FIG. 1, and showing the working chamber with full fluid vortex.

Referring to FIGS. 1, 2 and 3, the coupling comprises a driven shaft 2 supported within a bearing 3 and having a hub 4 upon which a vaned semi-toroidal impeller shell 5 is mounted. The impeller shell is contained within one side portion of a toroidal fluid reservoir shell 6 supported by and rotatable in unison with a semi-toroidal turbine shell 7 which is in complementary relationship to the impeller shell. The turbine shell is attached to a supporting flange 8 carried by a hub 9 mounted upon a driven or output shaft 10 journalled within a support bearing 12. The peripheral edge of the turbine shell is formed with a rim 13 attached to and supporting the reservoir shell and whereby the reservoir shell rotates with the turbine shell. The central portions of the reservoir shell walls encircling the stationary outer casings 14 of the bearing assemblies 3 and 12 carry usual fluid seal rings 15.

The portion 16 of the reservoir shell surrounding the turbine shell provides the reservoir and contains one or more stationary radially directed fluid scoop pipes 17 carried by brackets 18 mounted upon the stationary bearing casing 14 of the bearing 12 and positioned interiorly of the reservoir. The inner end of the scoop pipes extend towards an annular arrangement of ports 19 in the inner peripheral portion of the turbine shell and whereby scooped fluid is directed into the working chamber.

For withdrawal of fluid from the coupling working chamber 20 for torque reduction one or more radial fluid ejection tubes 21 are mounted upon the interior face of the turbine shell 7 to rotate in unison therewith. The tubes are curved to follow and lie along the curvature of the shell, each being located adjacently to one of the turbine vanes 22, as shown in FIG. 2. The fluid receiving outer ends of the tubes 21 extend to the vicinity of the turbine shell rim 13 attached to the reservoir, the inner ends of the tubes projecting through orifices 23 in the inner diameter portion of the shell to direct fluid withdrawn from the working chamber 20 into the scoop pipe containing portion 16 of the reservoir.

Operation

In practice, the volume of fluid in the coupling is such that when the coupling is at rest the level of fluid in the lower portion of the coupling is approximately that of the line A—A, FIG. 1. Upon rotation of the impeller shell 5 the coupling fluid acquires usual vortex motion in the working chamber 20, and as starting load torque retards rotative speed of the turbine shell 7 and attached reservoir shell 6, fluid in its vortex motion passes into the turbine shell tubes 21 to be ejected into the portion 16 of the reservoir shell, as shown in FIG. 1, thus reducing the volume of fluid in the working chamber for transmission of desired starting torque. Under such starting conditions the reservoir shell 6 is rotating relatively slowly whereby the fluid scooping action of the scoop pipes 17 in returning fluid through the ports 19 to the working chamber is relatively small, thus only providing a reduced volume of fluid in the working chamber, as shown in FIG. 1. As the turbine and attached fluid reservoir gains speed the fluid scooping action of the scoop pipes 17 increases while the fluid ejection action of the ejection tubes 21 decreases as they reach a condition wherein the tubes, rotating at substantially the same speed as the impeller, impart sufficient centrifugal force to retard fluid flow therethrough from the working chamber, the chamber thus attaining its full fluid transmission capacity as shown in FIG. 3, and whereby the small volume centrifugal fluid ring remaining in the reservoir is generally beyond the fluid scooping openings of the scoop pipes.

Should an overload occur with consequent retardation of rotative speed of the turbine, the velocity of the fluid vortex in the working chamber 20 will overcome reduced centrifugal fluid resistance in the tubes and eject fluid through the tubes and thus increase the volume of fluid in the reservoir and reduce the fluid volume in the working chamber in relation to torque created by the overload. Upon return to normal load the scoop pipes, in response to increased speed of the reservoir, will immediately fill the work chamber to normal fluid capacity.

Figure 4:
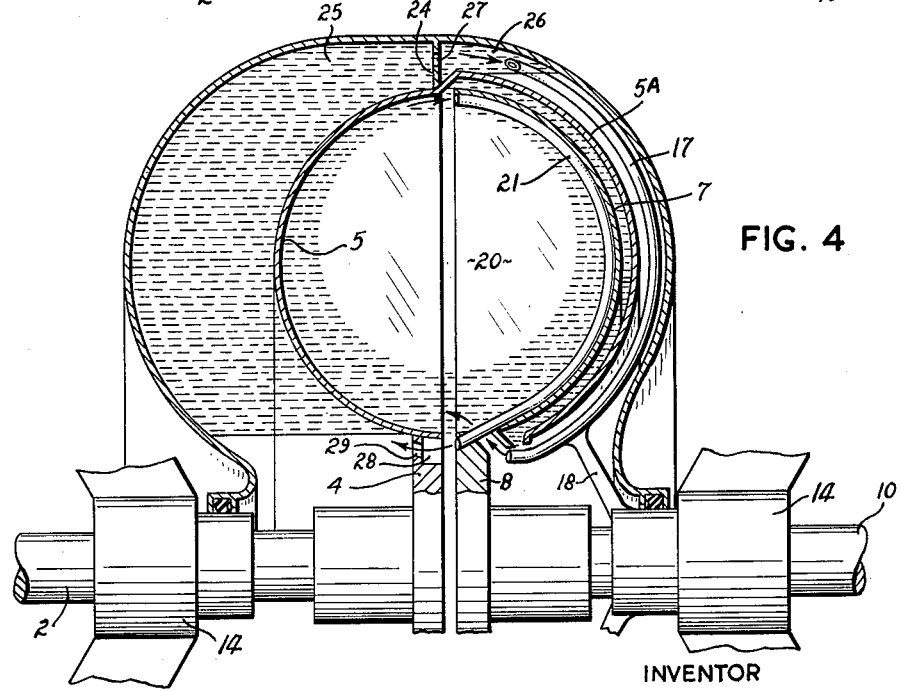
FIG. 4 is a cross-sectional view through a portion of the modified coupling arrangement and showing fluid circulation through the working chamber of the coupling for reduction of torque under excessive load.
Figure 5:
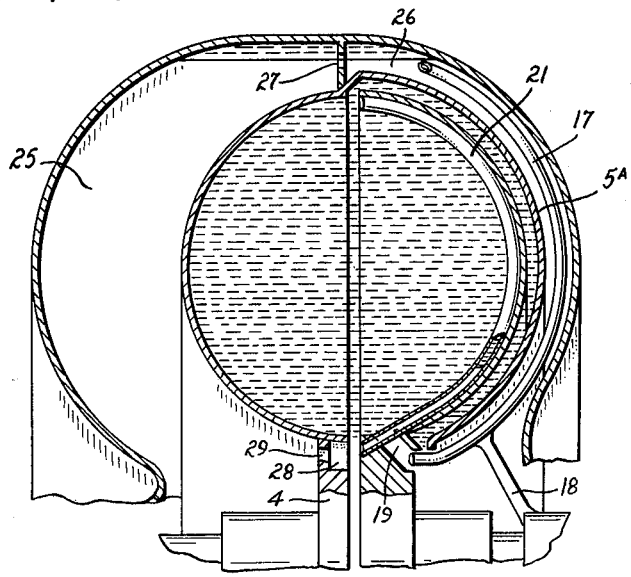
FIG. 5 is a similar cross-sectional view to FIG. 4 and showing the working chamber with full fluid vortex.

In the modified arrangement, as shown in FIGS. 4 and 5, a basically similar arrangement of impeller and turbine shells and their mountings, fluid ejection tubes 21 and scoop pipes 17 are used, the difference in arrangement being that the reservoir supporting rim 13 extending from the turbine shell is replaced by a reservoir supporting rim 24 extending from the impeller shells 5 and whereby the reservoir is connected to the shell and rotates therewith, the rim constituting a partition dividing the reservoir into a fluid ejection compartment 25 and a fluid receiving compartment 26, the partition containing one or more ports 27 through which fluid may flow in retarded passage from the ejection compartment to the receiving compartment. The impeller shell 5 is of toroidal form having a portion 5A surrounding and spaced away from the turbine shell 7. The fluid ejection tubes 21 inject fluid into the portion 25 of the reservoir by direct fluid flow into a circular recess 28 in the face of the impeller shell hub 4 and from which the fluid passes through ports 29 into the reservoir fluid ejection compartment 25.

Operation

As the fluid reservoir rotates in unison with the impeller shell, actuation of the drive shaft 2 constantly rotates the reservoir at drive shaft speed with the result that under starting conditions, as shown in FIG. 4, the scoop pipes are removing fluid at full capacity from the reservoir fluid receiving chamber 26 and transferring it into the working chamber through the ports 19. As the ports 27 in the partition 24 are of a reduced size to retard fluid flow relative to the scooping capacity of the scoop pipes 17 major volume of the fluid accumulates in the compartment 25. At the same time fluid in the working chamber 20 acquires usual vortex motion and as starting load torque retards rotative speed of the turbine shell 7, fluid in its vortex motion passes into the turbine shell tubes 21 to be ejected through the recess 28 and ports 29 into the reservoir chamber 25 and thus maintain a reduced volume of fluid in the working chamber, as shown in FIG. 4. As the turbine gains speed the fluid removing action of the tubes 21 decreases due to the tubes attaining sufficient centrifugal force to retard fluid flow therethrough from the working chamber, the chamber thus attaining its full fluid transmission as shown in FIG. 5, and whereby the small volume fluid ring remaining in the reservoir is generally beyond the fluid scooping openings of the scoop pipes.

Should an overload occur with consequent retardation of the rotative speed of the turbine and tubes 21 fluid will be withdrawn through the tubes from the working chamber and thus create fluid flow through the scoop pipes and reservoir. Upon return to normal load speed of the turbine shell, passage of fluid through the tubes 21 ceases with resultant filling of the work chamber to full fluid capacity.

What I claim as my invention is:

1. In a fluid coupling comprising a vaned impeller shell rotatable by a prime mover, a vaned turbine shell having the same axis of rotation as the impeller shell and rotatable by the impeller shell, the shells encompassing a fluid containing working chamber wherein rotation of the impeller shell impels the fluid in the chamber in a vortex path; means for automatically withdrawing a proportion of the fluid volume from the working chamber for the purpose of reducing torque load upon the prime mover in proportion to load upon the turbine shell and comprising a fluid reservoir rotatable about the axis of the impeller and turbine shells and rotated by and in unison with one of the shells, an open ended fluid circulation tube for ejection of fluid from the working chamber into the reservoir, the tube being contained within and extending radially of the working chamber and rotating in unison with the turbine shell, one open end of the tube being in the radially-outermost portion of the chamber and directed toward said impeller shell and into the fluid vortex in the chamber for reception of fluid flow therefrom under conditions wherein momentum of the vortex fluid flow is greater than outward centrifugal fluid thrust in the rotating tube, a fluid scoop pipe contained within a portion of the reservoir and communicating with working chamber for return of fluid from the reservoir to the working chamber, and means holding said scoop pipe stationary.

2. A fluid coupling as defined in claim 1, wherein the turbine shell is of semi-toroidal form having a concave inner face, the fluid ejection tube being curved and extending radially along and attached to the inner face of the turbine shell.

3. A fluid coupling as defined in claim 1, wherein the reservoir is connected to the turbine shell to rotate in unison with the shell.

4. A fluid coupling as defined in claim 1, wherein the turbine shell is of semi-toroidal form having a concave inner face, the fluid ejection tube being curved and attached to the inner face of the turbine shell, the reservoir being of toroidal form surrounding the working chamber of the coupling and connected to the turbine shell to rotate in unison with the shell.

5. A fluid chamber as defined in claim 2, wherein the turbine shell is formed with an annular arrangement of ports for admittance of fluid from the scoop pipe into the working chamber.

6. A fluid coupling as defined in claim 1, wherein the turbine shell is of semi-toroidal form and formed with an annular arrangement of ports for admittance of fluid from the scoop pipe into the working chamber, the reservoir being connected to the turbine shell to rotate in unison therewith.

References Cited by the Examiner

UNITED STATES PATENTS

| | | | |
|---|---|---|---|
| 1,910,696 | 5/33 | Kiep | 60—54 |
| 1,963,720 | 6/34 | Sinclair | 60—54 |
| 2,281,161 | 4/42 | Kuhns et al. | 60—54 |
| 2,372,748 | 4/45 | Swift | 60—54 |
| 2,423,812 | 7/47 | Karl et al. | 60—54 |
| 2,570,768 | 10/51 | Clerk | 60—54 |
| 2,582,952 | 1/52 | Becker | 60—54 |
| 2,875,581 | 3/59 | Kugel | 60—54 |
| 2,917,899 | 12/59 | Kollmann et al. | 60—54 |
| 2,987,887 | 6/61 | Fowler | 60—54 |
| 3,027,720 | 4/62 | Tuck et al. | 60—54 |

JULIUS E. WEST, *Primary Examiner.*